Jan. 19, 1971 R. E. TIBBETTS ET AL 3,556,643
HIGHLY CORRECTED SEVEN ELEMENT GAUSS TYPE REDUCTION LENS
Filed Aug. 15, 1969                                            3 Sheets-Sheet 1

FIG. 1

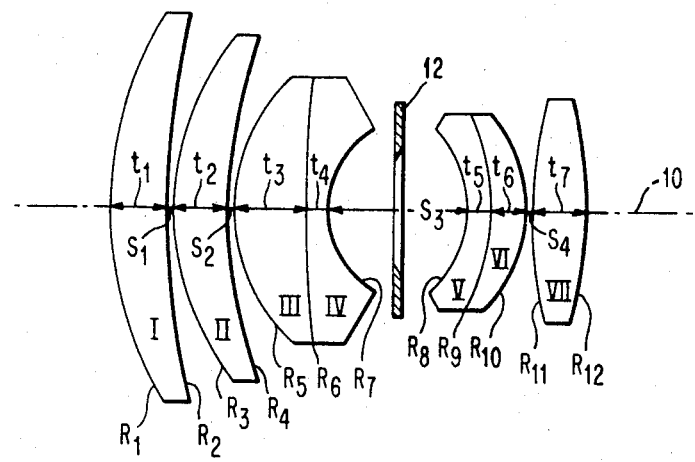

FIG. 2

| F/1.8 | | | | m = 0.1 X |
|---|---|---|---|---|
| LENS | RADIUS | THICKNESS (t) OR AIRSPACE (S) | $N_D$ | V |
| I | $R_1$ = +0.7516 F<br>$R_2$ = +1.6954 F | $t_1$ = .1191 F<br>$S_1$ = .0119 F | 1.69099 | 54.80 |
| II | $R_3$ = +0.5627 F<br>$R_4$ = +0.9872 F | $t_2$ = .1132 F<br>$S_2$ = .0119 F | 1.69099 | 54.80 |
| III | $R_5$ = +0.3711 F<br>$R_6$ = +2.8488 F | $t_3$ = .1429 F<br>$t_4$ = .0476 F | 1.69099 | 54.80 |
| IV | $R_7$ = +0.1982 F | $S_3$ = .2874 F | 1.72902 | 28.38 |
| V | $R_8$ = -0.2355 F<br>$R_9$ = -0.4611 F | $t_5$ = .0476 F<br>$t_6$ = .0756 F | 1.66470 | 35.95 |
| VI | $R_{10}$= -0.2995 F | $S_4$ = .0119 F | 1.69099 | 54.80 |
| VII | $R_{11}$ = +0.9210 F<br>$R_{12}$= -0.9028 F | $t_7$ = .1102 F | 1.69099 | 54.80 |

INVENTORS
RAYMOND E. TIBBETTS
JANUSZ S. WILCZYNSKI

BY *John J. Goodwin*

ATTORNEY

FIG. 6
FIG. 7
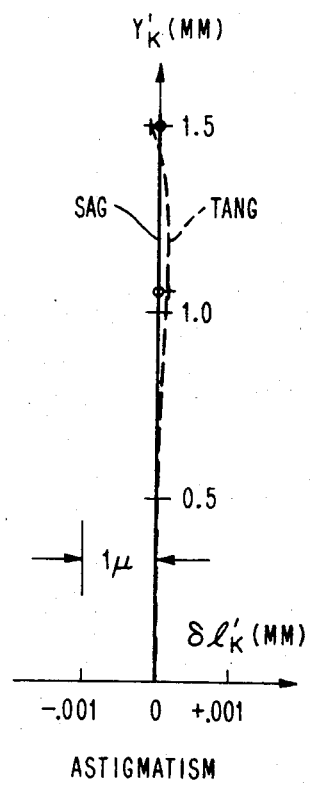
ASTIGMATISM
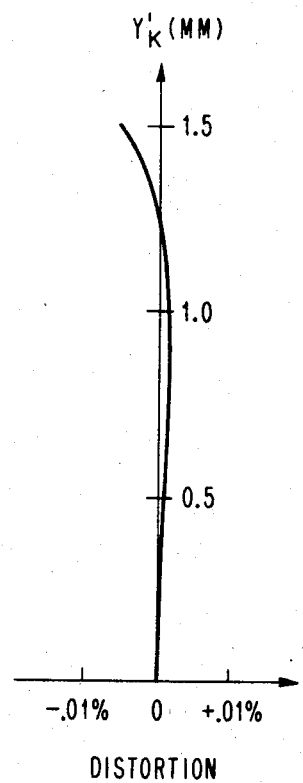
DISTORTION

United States Patent Office 3,556,643
Patented Jan. 19, 1971

3,556,643
HIGHLY CORRECTED SEVEN ELEMENT GAUSS TYPE REDUCTION LENS
Raymond E. Tibbetts, Mahopac, and Janusz S. Wilczynski, Ossining, N.Y., assignors to International Business Machines Corporation, Armonk, N.Y., a corporation of New York
Continuation-in-part of application Ser. No. 594,118, Nov. 14, 1966. This application Aug. 15, 1969, Ser. No. 869,421
Int. Cl. G02b 9/60
U.S. Cl. 350—218                    2 Claims

ABSTRACT OF THE DISCLOSURE

A lens group is described for use as a reduction lens. The lens group consists of seven lens elements. The first and second lens elements are meniscus singlet lenses. The third and fourth elements are cemented together to form a meniscus doublet lens as are the fifth and sixth lens elements. The seventh lens element is a bi-convex lens. The lens group has an extremely high uniform resolution over the image field and an exceedingly flat field with minimum zonal astigmatism. The constructional data of the lens elements have upper and lower limits and seven embodiments of lens groups of the present invention are set forth, all of which provide the high resolution and minimal zonal astigmatism.

---

This application is a continuation-in-part of copending parent patent application Ser. No. 594,118, filed Nov. 14, 1966, now abandoned.

BACKGROUND OF THE INVENTION

Field of the invention

The present invention relates to an optical lens system, and more particularly to a highly corrected Gauss type lens.

Prior art

U.S. Pat. 2,878,723 issued Mar. 24, 1959 to M. J. Herzberger is an example of a high resolution lens designed for microphotography. This lens is distinct from the present invention in construction and performance.

SUMMARY OF THE INVENTION

There is a present need for high resolution, minimum distortion lenses for microphotography, and more particularly for lenses for use in the fabrication of photomasks used in the production of semiconductor integrated circuits. In the production of integrated circuits of the type wherein thousands of circuit elements are contained on a wafer of a size in the order of three millimeters in diameter, it is usual that the wafer is first coated with a photosensitive resin and a photomask bearing thousands of rectangular transparent slits on an opaque background is placed in contact with the wafer which is then exposed to radiation. This process may be repeated several times using different masks on the same wafer to form the desired circuit elements on the wafer. It is evident that the sharpness of the pattern on the photomask determines the quality of the integrated circuit.

One of the methods generally used to make a photomask is known as the "step-and-repeat" method wherein large single original figures are reduced one after the other on a photographic plate which is positioned in both the X and Y directions in the plane of the plate. The step-and-repeat method employs a camera including a lens which should have the features of an extremely high uniform resolution over the desired field and an exceedingly flat field with minimum zonal astigmatism to facilitate the focal setting.

It is an object of the present invention to provide an optical lens system which is useful in the step-and-repeat method of photomask generation.

Another object of the present invention is to provide a highly corrected Gauss type lens.

A further object of the present invention is to provide an optical lens exhibiting minimum distortion and high uniform correction across the field.

The foregoing and other objects, features and advantages of the invention will be apparent from the following more particular description of a preferred embodiment of the invention as illustrated in the accompanying drawings.

BRIEF DESCRIPTION OF THE DRAWINGS

In the drawings:
FIG. 1 shows an optical diagram of a highly corrected Gauss type lens constructed according to the present invention.
FIG. 2 shows a chart of the constructional data for the lens of FIG. 1.

DESCRIPTION OF A PREFERRED EMBODIMENT

Referring to FIG. 1, a preferred embodiment of a lens system is shown including seven lens elements designated as element I through element VII. Elements I and II are meniscus singlet lenses. Elements III and IV are cemented together to form a meniscus doublet lens, elements V and VI are cemented together to form a meniscus doublet lens, and lens element VII is a bi-convex lens. The lenses are optically aligned on an axis 10 to have an effective focal length of 16.79 millimeters at a reduction of 10× and covering a linear image field of 3.0 millimeters diameter. The diaphragm is denoted by 12 and is 3.74 millimeters in diameter at $f/1.8$.

The following table of mathematical statements lists the ranges of constructional data related to the lens group of FIG. 1.

$.065F < +R_1 < .085F$—$.100F < t_1 < .130F$
$1.60F < +R_2 < 1.80F$—$.005F < S_1 < .020F$
$.52F < +R_3 < .60F$—$.106F < t_2 < .120F$
$.92F < +R_4 < 1.04F$—$.005F < S_2 < .020F$
$.34F < +R_5 < .40F$—$.140F < t_3 < .146F$
$2.20 < +R_6 < 3.40F$—$.045F < t_4 < .051F$
$.18F < +R_7 < .22F$—$.284F < S_3 < .290F$
$.21F < -R_8 < .26F$—$.045F < t_5 < .050F$
$.36F < -R_9 < .56F$—$.072F < t_6 < .078F$
$.26F < -R_{10} < .34F$—$.005F < S_4 < .020F$
$.85F < +R_{11} < .98F$—$.100F < t_7 < .120F$
$.83F < -R_{12} < .96F$ where F represents the effective focal length of the lens group (16.79 mm.) at 5461 angstroms. $R_1$ through $R_{12}$ represent the radii of the successive lens element surfaces, $t_1$ through $t_7$ designate the thickness of the successive lens elements measured along axis 10, $S_1$ through $S_4$ represent the respective spacing between lens elements I and II, II and III, IV and V, and VI and VII measured along axis 10. One preferred form of the lens group shown in FIG. 1 is listed in the table of FIG. 2 wherein the R, t, and S designations are as described and $N_D$ and V respectively represent the refractive index and the Abbe number of each lens element.

Figure 3:
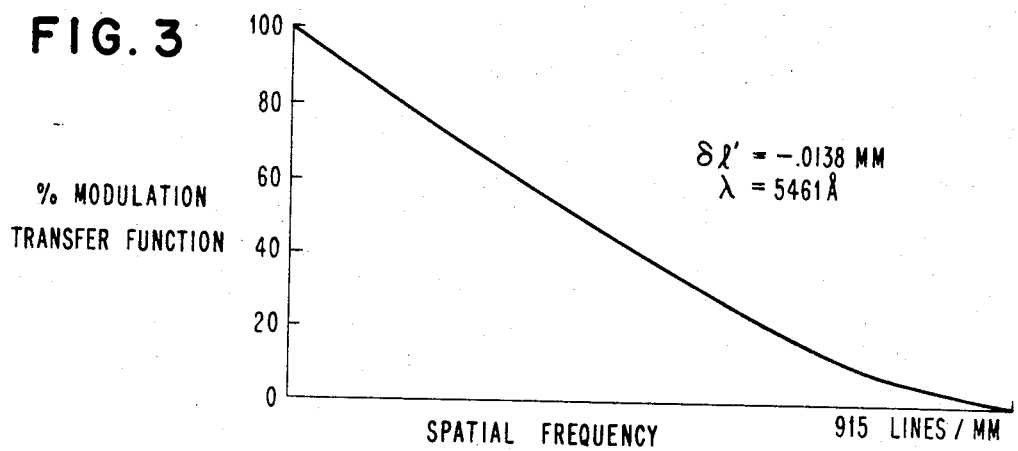
FIGS. 3, 4 and 5 are curves of the modulation transfer function of the lens of FIG. 1 calculated at the optical axis, at .7 field, and at full field, respectively.
Figure 4:
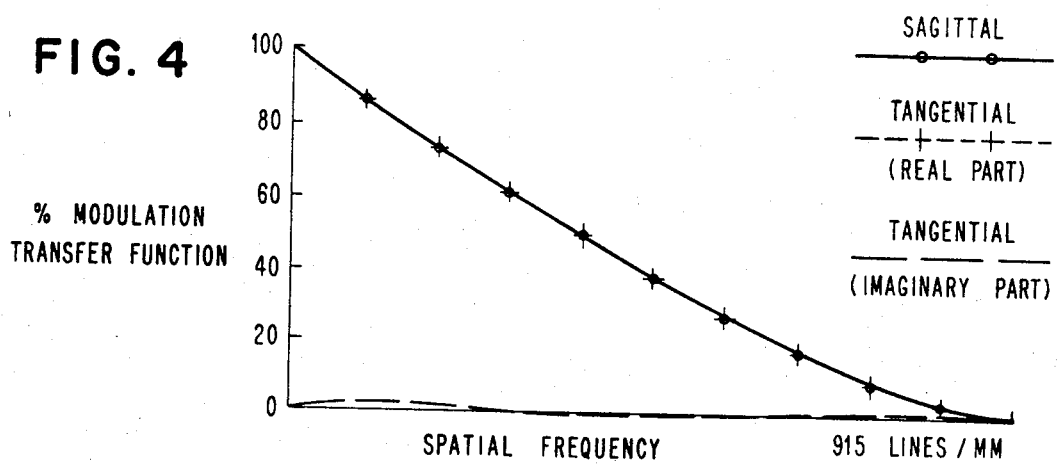
Figure 5:
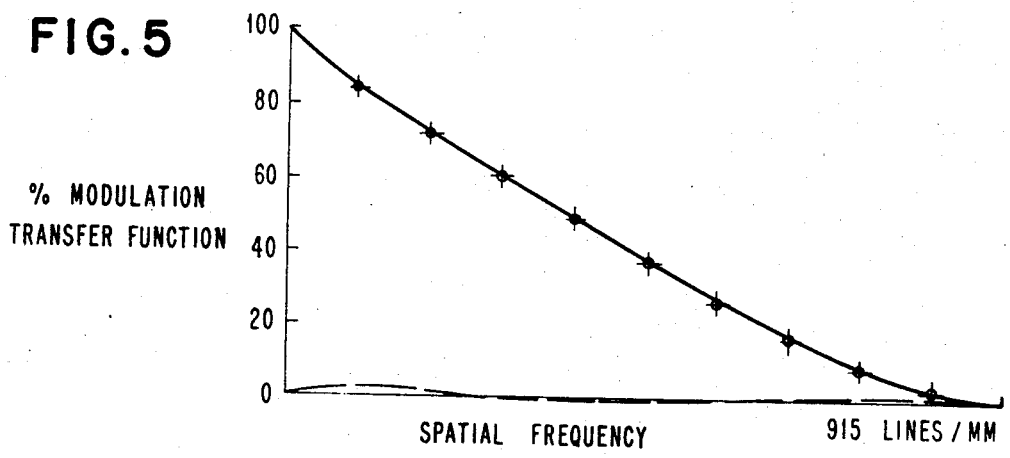

The performance of the lens of the present invention is extremely good and is more than suitable for the purposes described as can be seen from the curves in FIGS. 3, 4 and 5. FIG. 3 is a curve of the modulation transfer function of the lens group on the axis 10. FIG. 4 is a curve of the modulation transfer function at .7 field, and FIG. 5 is a curve of the modulation transfer function at full field. FIG. 6 shows a curve of the astigmatism and FIG. 7 shows a curve of the distortion.

The modulation transfer functions have been calculated for the lens group at a focal length of approximately 17 millimeters at a reduction of 10× and covering a linear image field of 3.0 millimeters diameter, all calculations being done at one focal setting, .0138 millimeter in front of the paraxial image plane. As can be seen from the curves, the performance of the lens group is excellent and uniform within one percent across the field. If the diffraction limit were to be drawn on the same diagram as the axial bundle (FIG. 3), it would be superimposed directly over the calculated modulation transfer function values. The astigmatism (FIG. 6) is also practically zero, as can be seen by the superimposition of the modulation values of the sagittal (sag) and tangential (tan) fans. In fact the maximum calculated difference between the sagittal and tangential modulation values is only 0.8 percent and the maximum value of the imaginary part of the tangential section is only 2.1 percent, this value being insignificant because of its occurring at a very coarse frequency, only 10 percent of the way to cut-off frequency. All other values of the imaginary part of the tangential fan are very small and are around the zero point, showing the emerging wavefronts across the field to be extremely symmetrical and also of the desired spherical shape. The loci of the centers of curvature of all emerging wavefronts form the image plane, flat to ±0.15 micron. The astigmatism at this image plane, ($\delta l'=-.0138$ millimeter) is shown in FIG. 6. The sagittal fan (sag) is essentially flat, while the tangential fan (tan) has the normal reverse hook of a Gauss lens but yields astigmatic residuals of only 0.1 micron, completely insignificant with respect to the focal range of ±4 microns ($\lambda=5461$ angstroms) with a working numerical aperture of 0.25 millimeter. With the monochromatic correction as shown in the modulation transfer function curves, and the astigmatism as stated above, the operation of the reduction camera is greatly facilitated. Also the reject rate caused by filling in between elemental line segments will be almost nil.

The distortion is shown in FIG. 7. At a focal length of approximately 17 millimeters, the maximum radial displacement of any point from its correct spatial position will be less than .08 micron.

The correction of the lens remains essentially unaltered for a wavelength band of 400 angstroms.

Other embodiments of lens systems in accordance with the present invention may be selected from the table of ranges previously set forth. The other embodiments will have the same extremely high resolution, correction and minimum distortion as set forth for the embodiment of FIG. 1. In particular, six additional embodiments of lens systems will be hereinafter set forth as embodiments two through seven. The embodiments have different constructional data than that of FIG. 1 and particular parameters have been selected to be at the limits of the ranges previously set forth. After specifying the six additional embodiments, the modulation transfer functions of the embodiments at axis, at .7 field and at full field will be set forth and compared in tabular form with the modulation transfer functions of the embodiment of FIG. 1 illustrated in FIGS. 3, 4 and 5. The modulation transfer functions of embodiments two through seven cannot be compared graphically with those shown in FIGS. 3, 4 and 5 because the scale used would not show any distinction. This in itself is an indication that all seven embodiments provide the same high resolution as will other embodiments of the invention with the ranges set forth.

EMBODIMENT TWO $R_1=+.7878F$
$R_2=+2.1779F$
$R_3=+.5146F$
$R_4=+.8422F$
$R_5=+.3915F$—$t_3=.1428F$
$R_6=+3.8535F$
$R_7=+.1991F$—$S_3=.2870F$
$R_8=-.2384F$
$R_9=-.4688F$
$R_{10}=-.3010F$
$R_{11}=+.9001F$
$R_{12}=-.9048F$

In this embodiment, $R_2$ is above its limit, $R_3$ and $R_4$ are each below their respective limits and other radii, thicknesses and airspaces have been altered to retain the high state of correction. The parameters which are not listed are unchanged and are the same as the corresponding parameters of the preferred embodiment.

EMBODIMENT THREE $R_1=+.7489F$—$t_1=.1185F$
$R_2=+1.6896F$—$S_1=.0119F$
$R_3=+.5582F$—$t_2=.1116F$
$R_4=+.9756F$—$S_2=.0119F$
$R_5=+.3681F$—$t_3=.1410F$
$R_6=+2.7578F$—$t_4=.0470F$
$R_7=+.1964F$—$S_3=.2895F$
$R_8=-.2355F$—$t_5=.0470F$
$R_9=-.4555F$—$t_6=.0746F$
$R_{10}=-.2985F$—$S_4=.0119F$
$R_{11}=+.9230F$—$t_7=.1087F$
$R_{12}=-.8982F$

In this embodiment, $S_3$ is at its upper limit.

EMBODIMENT FOUR $R_1=+.8500F$
$R_2=+1.8982F$
$R_3=+.5157F$
$R_4=+.9841F$
$R_5=+.3796F$
$R_6=+2.6165F$
$R_7=+.1978F$—$S_3=.2930F$
$R_8=-.2362F$
$R_9=-.4627F$
$R_{10}=-.2973F$
$R_{11}=+.8955F$
$R_{12}=-.9626F$

In this embodiment, $R_1$ is at its upper limit, $R_2$ is above its limit and $R_3$ is at its limit.

EMBODIMENT FIVE $R_1=+.7481F$—$t_1=.1184F$
$R_2=+1.6445F$—$S_1=.0118F$
$R_3=+.5585F$—$t_2=.1125F$
$R_4=+.9930F$—$S_2=.0118F$
$R_5=+.3689F$—$t_3=.1421F$
$R_6=+2.7246F$—$t_4=.0474F$
$R_7=+.1972F$—$S_3=.2858F$
$R_8=-.2364F$—$t_5=.0474F$
$R_9=-.4608F$—$t_6=.0752F$
$R_{10}=-.3053F$—$S_4=.0118F$
$R_{11}=+.9871F$—$t_7=.1096F$
$R_{12}=-.8151F$

In this embodiment, $R_{11}$ is at its upper limit and $R_{12}$ is slightly below its lower limit.

EMBODIMENT SIX $R_1 = +.7528F$
$R_2 = +1.6989F$
$R_3 = +.5633F$
$R_4 = +.9895F$
$R_5 = +.3716F$
$R_6 = +2.8286F$
$R_7 = +.1983F$
$R_8 = -.2356F$ — $t_5 = .0447F$
$R_9 = -.4593F$ — $t_6 = .0786F$
$R_{10} = -.2996F$
$R_{11} = +.9240F$
$R_{12} = -.9027F$

In this embodiment, $t_5$ is at its lower limit.

EMBODIMENT SEVEN $R_1 = +.7543F$ — $t_1 = .1186F$
$R_2 = +1.7033F$ — $S_1 = .0202F$
$R_3 = +.5613F$ — $t_2 = .1127F$
$R_4 = +.9850F$ — $S_2 = .0119F$
$R_5 = +.3700F$ — $t_3 = .1424F$
$R_6 = +2.8596F$ — $t_4 = .0475F$
$R_7 = +.1977F$ — $S_3 = .2862F$
$R_8 = -.2344F$ — $t_5 = .0475F$
$R_9 = -.4566F$ — $t_6 = .0753F$
$R_{10} = -.2979F$ — $S_4 = .0119F$
$R_{11} = +.9275F$ — $t_7 = .1097F$
$R_{12} = -.8935F$

In this embodiment, $S_1$ is at its upper limit.

The following table sets forth the modulation transfer functions of the seven embodiments. It can be seen that although given parameters were selected at the end of the ranges, the seven embodiments provide almost equal performance.

COMPARISON OF PREFERRED EMBODIMENT WITH OTHER EMBODIMENTS AT EDGES OF LIMITS

| Embodiment | Percent of limiting frequency | Percent MTF | | | | |
|---|---|---|---|---|---|---|
| | | Axis | .7 field | | Full field | |
| | | | Sag | Tan | Sag | Tan |
| Preferred | 25 | 66.2 | 67.2 | 66.7 | 66.8 | 65.8 |
| | 50 | 39.1 | 38.9 | 38.4 | 38.1 | 37.2 |
| | 75 | 14.4 | 14.4 | 14.3 | 14.1 | 13.5 |
| Two | 25 | 66.1 | 67.4 | 67.4 | 67.0 | 66.1 |
| | 50 | 39.0 | 39.1 | 39.0 | 38.6 | 37.2 |
| | 75 | 14.4 | 14.4 | 14.4 | 14.1 | 13.8 |
| Three | 25 | 66.4 | 67.3 | 66.8 | 66.6 | 65.8 |
| | 50 | 39.1 | 39.0 | 38.4 | 38.1 | 36.9 |
| | 75 | 14.4 | 14.4 | 14.2 | 14.1 | 13.4 |
| Four | 25 | 66.2 | 67.5 | 67.1 | 67.1 | 66.2 |
| | 50 | 39.1 | 39.1 | 38.7 | 38.5 | 37.3 |
| | 75 | 14.4 | 14.4 | 14.3 | 14.4 | 13.5 |
| Five | 25 | 66.6 | 66.9 | 66.3 | 66.3 | 65.4 |
| | 50 | 39.1 | 38.2 | 38.0 | 37.6 | 36.6 |
| | 75 | 14.4 | 14.2 | 14.0 | 13.7 | 13.1 |
| Six | 25 | 66.5 | 67.3 | 66.8 | 66.7 | 65.8 |
| | 50 | 39.1 | 38.9 | 38.4 | 38.0 | 37.1 |
| | 75 | 14.4 | 14.4 | 14.3 | 13.9 | 13.5 |
| Seven | 25 | 66.3 | 67.2 | 66.7 | 66.7 | 65.9 |
| | 50 | 39.1 | 38.8 | 38.3 | 38.0 | 36.8 |
| | 75 | 14.4 | 14.4 | 14.2 | 14.1 | 13.5 |

While the invention has been particularly shown and described with reference to preferred embodiments thereof, it will be understood by those skilled in the art that various changes in form and details may be made therein without departing from the spirit and scope of the invention.

What is claimed is:

1. A reduction lens comprising first, second, third, fourth, fifth, sixth and seventh optically aligned lens elements, wherein said first and second lens elements are meniscus singlet lenses, lens elements three and four are cemented together to form a meniscus doublet lens, lens elements five and six are cemented together to form a meniscus doublet lens and lens element seven is a bi-convex lens, wherein said first lens element has radii of curvature $R_1$ and $R_2$ and thickness $t_1$, said second lens element has radii of curvature $R_3$ and $R_4$ and thickness $t_3$, said third lens element has radii $R_5$ and $R_6$ and thickness $t_3$, said fourth lens element has radii $R_6$ and $R_7$ and thickness $t_4$, said fifth lens element has radii $R_8$ and $R_9$ and thickness $t_5$, said sixth lens element has radii $R_9$ and $R_{10}$ and thickness $t_6$, and said seventh lens element has radii $R_{11}$ and $R_{12}$ and thickness $t_7$, and wherein said first and second lens elements are separated by an axial distance $S_1$, said second and third lens elements are separated by an axial distance $S_2$, said fourth and fifth lens elements are separated by an axial distance $S_3$ and said sixth and seventh lens elements are separated by an axial distance $S_4$, and wherein the radii, thicknesses and distances of the lens elements are within the limits as a function of the focal length F as follows:

$.065F < +R_1 < .085F$ — $.100F < t_1 < .130F$
$1.60F < +R_2 < 1.80F$ — $.005F < S_1 < .020F$
$.52F < +R_3 < .60F$ — $.106F < t_2 < .120F$
$.92F < +R_4 < 1.04F$ — $.005F < S_2 < .020F$
$.34F < +R_5 < .40F$ — $.140F < t_3 < .146F$
$2.20F < +R_6 < 3.40F$ — $.045F < t_4 < .051F$
$.18F < +R_7 < .22F$ — $.284F < S_3 < .290F$
$.21F < -R_8 < .26F$ — $.045F < t_5 < .050F$
$.36F < -R_9 < .56F$ — $.072F < t_6 < .078F$
$.26F < -R_{10} < .34F$ — $.005F < S_4 < .020F$
$.85F < +R_{11} < .98F$ — $.100F < t_7 < .120F$
$.83F < -R_{12} < .96F$

2. A reduction lens having numerical data substantially as follows:

| Lens | Radius | Thickness (t) or airspace (S) | $N_D$ | V |
|---|---|---|---|---|
| I | $R_1 = +0.7516F$ | $t_1 = .1191F$ | 1.69099 | 54.80 |
| | $R_2 = +1.6954F$ | $S_1 = .0119F$ | | |
| II | $R_3 = +0.5627F$ | $t_2 = .1132F$ | 1.69099 | 54.80 |
| | $R_4 = +0.9872F$ | $S_2 = .0119F$ | | |
| III | $R_5 = +0.3711F$ | $t_3 = .1429F$ | 1.69099 | 54.80 |
| IV | $R_6 = +2.8488F$ | $t_4 = .0476F$ | 1.72902 | 28.38 |
| | $R_7 = +0.1982F$ | $S_3 = .2874F$ | | |
| V | $R_8 = -0.2355F$ | $t_5 = .0476F$ | 1.66470 | 35.95 |
| VI | $R_9 = -0.4611F$ | $t_6 = .0756F$ | 1.69099 | 54.80 |
| | $R_{10} = -0.2995F$ | $S_4 = .0119F$ | | |
| VII | $R_{11} = +0.9210F$ | $t_7 = .1102F$ | 1.69099 | 54.80 |
| | $R_{12} = -0.9028F$ | | | | where F represents the effective focal length of the lens group (16.79 millimeters) at 5461 angstroms, $R_1$ through $R_{12}$ represent the radii of curvature of the surfaces of the respective lens or elements, $t_1$ through $t_7$ designate the thickness of the respective lens elements 10, $S_1$ through $S_4$ represent the respective spacing between the respective lens elements, and $N_D$ and V respectively represent the refractive index and the Abbe number of each lens element.

References Cited

UNITED STATES PATENTS 2,319,171  5/1943  Warmisham et al. ____ 350—218
2,878,723  3/1959  Herzberger _____ 350—218

JOHN K. CORBIN, Primary Examiner